US008467752B2

(12) United States Patent
Iwasa

(10) Patent No.: US 8,467,752 B2

(45) Date of Patent: Jun. 18, 2013

(54) RECEIVING DEVICE AND CONTROL METHOD FOR RECEIVING DEVICE

(75) Inventor: Eiichi Iwasa, Saitama (JP)

(73) Assignee: Clarion Co., Ltd., Saitama (JP)

( * ) Notice: Subject to any disclaimer, the term of this patent is extended or adjusted under 35 U.S.C. 154(b) by 302 days.

(21) Appl. No.: 12/992,527

(22) PCT Filed: Jun. 1, 2009

(86) PCT No.: PCT/JP2009/002438

§ 371 (c)(1), (2), (4) Date: Nov. 12, 2010

(87) PCT Pub. No.: WO2009/147824

PCT Pub. Date: Dec. 10, 2009

(65) Prior Publication Data

US 2011/0065401 A1 Mar. 17, 2011

(30) Foreign Application Priority Data

Jun. 2, 2008 (JP) .................................. 2008144212

(51) Int. Cl.
*H04B 1/18* (2006.01)

(52) U.S. Cl.
USPC ...................................... 455/150.1; 455/3.06

(58) Field of Classification Search
USPC ...................................................... 455/150.1
See application file for complete search history.

(56) References Cited

U.S. PATENT DOCUMENTS

2011/0021136 A1* 1/2011 Patsiokas et al. ............ 455/3.06

FOREIGN PATENT DOCUMENTS

| | | |
|---|---|---|
| JP | 2002-084469 | 3/2002 |
| JP | 2002-354285 | 12/2002 |
| JP | 2005-151215 | 6/2005 |

OTHER PUBLICATIONS

International Preliminary Report on Patentability and Written Opinion of the International Searching Authority issued in International Patent Application No. PCT/JP2009/002438, dated Jan. 28, 2011.

* cited by examiner

*Primary Examiner* — Ajibola Akinyemi

(74) *Attorney, Agent, or Firm* — McDermott Will & Emery LLP

(57) ABSTRACT

A receiving device that can maintain a desired search condition is provided.

There are provided storing means (RAM 15*b*) for storing a category contained in upper category information of a channel under reception, display means (LCD 17) for displaying the stored category, instructing means (touch panel 18) for accepting an instruction of execution of search, searching means (main microcomputer 15) for searching a channel containing the stored category as the upper or lower category information when the search execution is instructed, tuning means (satellite tuner 12) for tuning and receiving the searched channel, and control means (main microcomputer 15) for shifting to a state that the category of the search condition can be input when the search execution is instructed, storing the category concerned as a new search condition into the storing means when the category is input and making the searching means perform search, and making the display means display the category concerned.

4 Claims, 11 Drawing Sheets

FIG.2

| CHANNEL NUMBER | CHANNEL NAME | PRIMARY CATEGORY | SECONDARY CATEGORY | | |
|---|---|---|---|---|---|
| | | | 1 | 2 | 3 |
| 4 | The '40s | Decades | Hits | Pop | Jazz |
| 8 | The '80s | Decades | Hits | Pop | Rock |
| 20 | Top 20 Hits | Hits | Pop | Rock | |
| 41 | '80s Hard Rock | Rock | Hits | | |
| 42 | Heavy Metal | Rock | | | |
| 60 | Classic Soul | Hip-Hop | Dance | Hits | |
| 72 | Modern Jazz | Jazz | | | |
| ⋮ | ⋮ | ⋮ | ⋮ | ⋮ | ⋮ |

RECEIVING DEVICE AND CONTROL METHOD FOR RECEIVING DEVICE

RELATED APPLICATIONS

This application is the U.S. National Phase under 35 U.S.C. §371 of International Application No. PCT/JP2009/002438, filed on Jun. 1, 2009, which in turn claims the benefit of Japanese Application No. 2008-144212, filed on Jun. 2, 2008, the disclosures of which Applications are incorporated by reference herein.

TECHNICAL FIELD

The present invention relates to a receiving device for receiving broadcast containing plural channels, and a control method for the receiving device.

BACKGROUND ART

A technique relating to a receiving device for receiving satellite digital radio has been disclosed (for example, see Patent Document 1).

In the satellite digital radio broadcast, a service for supplying programs of 150 or more channels has been performed, and the receiving device is provided with a search function so that a user (listener) can easily select his/her desired channel from many channels as described above.

A category search function is known as one kind of search function described above. The category search function is a function of searching a channel on the basis of information of a category which is allocated to each channel in advance.

The satellite digital radio broadcast contains a broadcast in which plural category information pieces are allocated to each channel. In this case, one category information piece is set as upper category information, and the other category information pieces are set as lower category information. The upper category information is a category which is most associated with the characteristic of the channel concerned, and it is displayed on a display screen during reception of the channel concerned. Here, when the search based on the category search function is executed during reception, a typical receiving device sets category information being displayed on the display screen, that is, upper category information of a channel under reception as a search condition, and searches a channel containing the category of this search condition as upper category information or lower category information. That is, when the category search is instructed to start, the category information being displayed is automatically set as a search condition, and the search is executed. This is to enable the search to be executed even when an input for specifying a search condition is not made, and there is an advantage that a channel whose category is identical to the channel under reception can be searched at a small number of operation times. Furthermore, the construction for displaying the upper category information and the construction of setting the category information being displayed as the search condition are supplied with only one category information, and thus there is an advantage that the display and search of the category information can be surely executed even when there is a channel having no lower category information.

PRIOR ART DOCUMENT

Patent Document

Patent Document 1: JP-A-2002-354285

SUMMARY OF THE INVENTION

Problem to be Solved by the Invention

However, when the above category search function is repeatedly executed, there is a case where the search condition is changed although a user does not instruct. When another channel searched by the category search function is received, the upper category information of this channel is displayed on the display screen, and when the category search function is executed again, the category information being displayed is set as the search condition. Here, when a channel containing the category of the search condition as lower category information, the upper category information of this channel is displayed, and thus it is set as the search condition for the next category search function. In this case, the upper category information is not coincident with the lower category information, and thus the search is replaced from the lower category information of this channel to the upper category information. Accordingly, there is a problem that the search condition is changed while the category search function is repeatedly executed, and thus the user cannot perform his/her desired search.

Therefore, the present invention has an object to provide a receiving device that can keep a search condition desired by a user when channel search based on category information is repeatedly executed, and a control method for the receiving device. Furthermore, the present invention has another object to provide a receiving device that enables a search based on a small number of operation times and can support a channel having only one category information, and a control method for the receiving device.

Means of Solving the Problem

In order to solve the above problem, according to the present invention, a receiving device for receiving any channel from plural channels through which broadcast is performed is characterized by comprising: storing means for storing a category contained upper category information of a channel under reception when each channel is associated with one or plural category information pieces representing a category of the channel concerned, one category information piece is set as upper category information and the other category information pieces are set as lower category information; display means for displaying a category stored in the storing means; instructing means for accepting an instruction of search execution during reception of the channel; search means for searching the channel containing the category stored in the storing means as the upper category information or the lower category information when the search execution is instructed by the instructing means; tuning means for tuning and receiving the channel searched by the searching means; and control means for shifting to a state that a category as a search condition can be input when the search execution is instructed by the instructing means, and storing an input category as a new search condition into the storing means when the category is input under the state, making the searching means perform a search, and making the display means display the stored category.

According to the construction described above, when the search execution is instructed, the display means displays the category stored in the storing means, the searching means searches the channel containing the stored category as the upper category information or the lower category information, and the tuning means tunes and receives the searched channel. When a category is input, the input category is stored as a new search condition into the storing means so that the searching means performs the search, and also this stored category can be displayed by the display means. Therefore, the display means can display the category stored in the storing means, and also the searching means sets the category stored in the storing means as a search target.

Therefore, when the search of the channel based on the category information is repeatedly executed, the search condition desired by the user can be maintained. Furthermore, the search based on a small number of operation times is enabled, and a channel having only one category information can be supported.

Furthermore, another invention is characterized in that the control means displays a list of categories which can be selectively input as a search condition when the search execution is instructed by the instructing means, displays categories stored in the storing means out of the categories displayed in the list so that the categories can be selected, and stores a selected category as a new search condition into the storing means when another category out of the categories of the list is selected.

According to the construction as described above, when the search execution is instructed, the control means displays a list of categories which can be selectively input as a search condition, and displays the categories stored in the storing means out of the categories of the displayed list so that the categories can be selected. When another category out of the categories of the displayed list is selected, the control means stores the selected category as a new search condition into the storing means. Therefore, the category of the search condition is displayed so as to be selectable.

Therefore, a category as a search target can be known by consulting the category which is displayed so as to be selectable out of the categories displayed as a list.

Another invention is characterized in that after the category selected from the displayed list of the categories is stored in the storing means, the control means stores the category stored in the storing means without changing the category until another category is selected from the displayed list of the categories or an operation of instructing to finish the search is executed after the category.

According to the construction as described above, after the category selected from the display list of the categories is stored in the storing means, the control means stores the category stored in the storing means without changing the category until another category is selected from the displayed list of the categories or an operation of instructing to finish the search is executed after the category. Accordingly, the category stored in the storing means is maintained unless the above operation is executed.

Therefore, the search based on the same category is executed consistently unless until another category is selected from the displayed list of the categories or it is instructed to finish the search, and thus the search condition can be prevented from being changed in the process of repeating the category search function.

Furthermore, another invention is characterized in that the receiving device is an in-vehicle mount type receiving device that is mounted in a vehicle and receives the broadcast under running of the vehicle.

According to the construction as described above, the receiving device is mounted in a vehicle, and can receive a broad during running of the vehicle.

Therefore, the search based on a small number of operation times can be executed even when the vehicle is being driven.

Still furthermore, according to the present invention, a control method for a receiving device for receiving any channel from a plurality channels to be broadcasted is characterized by comprising: a storing step for storing a category contained upper category information of a channel under reception when each channel is associated with one or plural category information pieces representing a category of the channel concerned, one category information piece is set as upper category information and the other category information pieces are set as lower category information; a display step for displaying a category stored in the storing step; an instructing step for accepting an instruction of search execution during reception of the channel; a control step for shifting to a state that a category as a search condition can be input when the search execution is instructed in the instructing step, storing an input category as a new search condition when the category is input under the state concerned, and displaying the stored category in place of the category displayed in the display step; a search step for searching the channel containing the category stored in the storing step as the upper category information or the lower category information; and a tuning step for tuning and receiving the channel searched in the searching step.

According to the method as described above, when the execution of the search is instructed, the category stored in the storing step is displayed, the channel containing the stored category as the upper category information or the lower category information is searched in the searching step, the searched channel is tuned and received in the tuning step, when a category is input, the input category is stored as a new search condition in the storing step and searched in the searching step, and the stored category is displayed in the display step. In the display step, the category stored in the storing step is displayed, and in the searching step the category stored in the storing step is set as a search target.

Therefore, when the channel search based on the category information is repeatedly executed, the search condition desired by the use can be maintained. Furthermore, the search based on a small number of operation times is enabled, and the present invention is adaptable to a channel having only one category information piece.

Effect of the Invention

According to the present invention, there can be provided the receiving device that can maintain a search condition desired by a user when the channel search based on category information is repeatedly executed, and a control method for the receiving device. Furthermore, there can be also provided a receiving device that enables the search based on a small number of operation times and also is adaptable to a channel having only one category information, and a control method for the receiving device.

BRIEF DESCRIPTION OF THE DRAWINGS

FIG. 2 shows an example of a table stored in RAM.

MODE FOR CARRYING OUT THE INVENTION

(A) Configuration of First Embodiment

An embodiment according to the present invention will be described hereunder with reference to the drawings.

Figure 1:
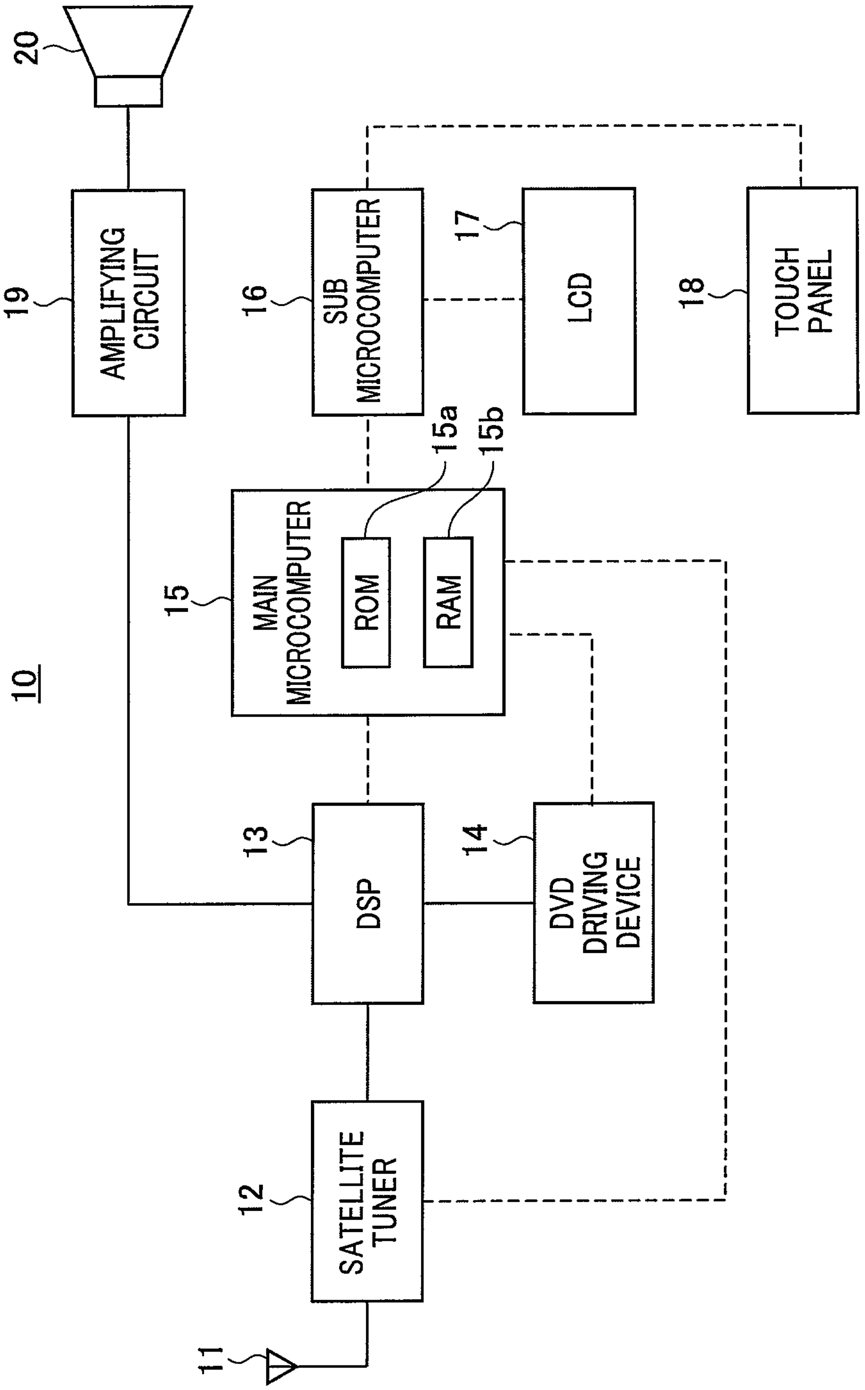
FIG. 1 is a block diagram showing an example of the construction of an embodiment.

FIG. 1 is a diagram showing an example of the construction of an in-vehicle mount type receiving device 10 according to an embodiment of the present invention. As shown in FIG. 1, the receiving device 10 has an antenna 11, a satellite tuner 12, DSP (Digital Signal Processor) 13, DVD (Digital Versatile Disk) driving device 14, a main microcomputer 15, a sub microcomputer 16, LCD (Liquid Crystal Display) 17, a touch panel 18, an amplifying circuit 19 and a speaker 20 as main constituent elements. In FIG. 1, a solid line represents an audio signal, and a dashed line represents a control signal.

The antenna 11 captures electrical waves of satellite radio broadcasts transmitted from a broadcast satellite (not shown), and supplies the electrical waves to the satellite tuner 12. Here, the satellite radio broadcast has about 250 channels, for example, and each of the channels transmits a digitalized audio signal. Furthermore, as described later, each channel has two types of categories of a primary category and a secondary category, and the contents of the broadcast are indicated by items allocated to these categories. Furthermore, a desired channel can be found by searching on the basis of these categories.

The satellite tune 12 selects and receives a broadcast of a prescribed channel specified by the main microcomputer 15 from the electrical waves of the satellite radio broadcast which are captured by the antenna 11, and outputs the broadcast concerned to DSP 13. DSP 13 selects any one of an output from the satellite tuner 12 and an output of the DVD driving device 14 under the control of the main microcomputer 15. Furthermore, DSP 13 executes decoding processing on signals supplied from the satellite tuner 12 and the DVD driving device 14 to generate audio data. Furthermore, DSP 13 executes filtering processing and volume adjusting processing on the generated audio data, converts the data to an audio signal as an analog signal and outputs it to the amplifying circuit 19.

The DVD driving device 14 reads out information written in DVD as an optical recording medium, and outputs it to DSP 13. The main microcomputer 15 has ROM (Read Only Memory) 15*a* and RAM (Random Access Memory) 15*b*, and executes a program stored in ROM 15*a* with RAM 15*b* being used as a work area, thereby controlling the various units of the device. In RAM 15*b* are stored a table of FIG. 2 described later and information on a first selection category, a second selection category, etc. described later.

The sub microcomputer 16 executes drawing processing on the basis of a drawing command supplied from the main microcomputer 15, and supplies a thus-obtained image to LCD 17 to display the image. Furthermore, the sub microcomputer 16 generates information corresponding to an operation of the touch panel 18, and outputs the information to the main microcomputer 15. LCD 17 displays a picture supplied from the sub microcomputer 16. The touch panel 18 is disposed so as to be superposed on LCD 17, and refers to information displayed on LCD 17. When an user's operation is executed, the touch panel 18 generates and outputs the corresponding information.

The amplifying circuit 19 amplifies the audio signal supplied from DSP 13 with a predetermined gain to amplify power, and then supplies the amplified audio signal to the speaker 20. The speaker 20 electroacoustically transduces the audio signal supplied from the amplifying circuit 19 and emits sounds.

As described above, the satellite radio broadcasting contains broadcasts of about 250 channels, and the satellite tuner 12 selects and receives the broadcast of a prescribed channel specified by the main microcomputer 15. The table as shown in FIG. 2 is stored in RAM 15*b* of the main microcomputer 15, for example, and the channel to be received is selected on the basis of the table as described above. More specifically, in the example of FIG. 2, "channel number", "channel name", "primary category (upper category" and "secondary category (lower category)" are stored in association with one another. Here, "channel number" represents the number of a channel allocated to each broadcast, "4" is stored as the channel number in an example of a first line. "channel name" represents an appellation given to each channel, and "The '40" is stored as the channel name in the example of the first line. "Primary category" is information which most remarkably represents the characteristic of each channel, and in the example of the first line, "Decades" is stored as the primary category. "Secondary category" is information representing relevant characteristics other than the primary category, and in the example of the first line, three categories of "Hits", "Pop" and "Jazz" are stored as the secondary category. The information stored in the table is transmitted while superimposed on broadcast electrical wave, and thus the main microcomputer 15 obtains such information from the satellite tune 12 and stores the information as a table into RAM 15*b*.

(B) Operation of Embodiment

Figure 3:
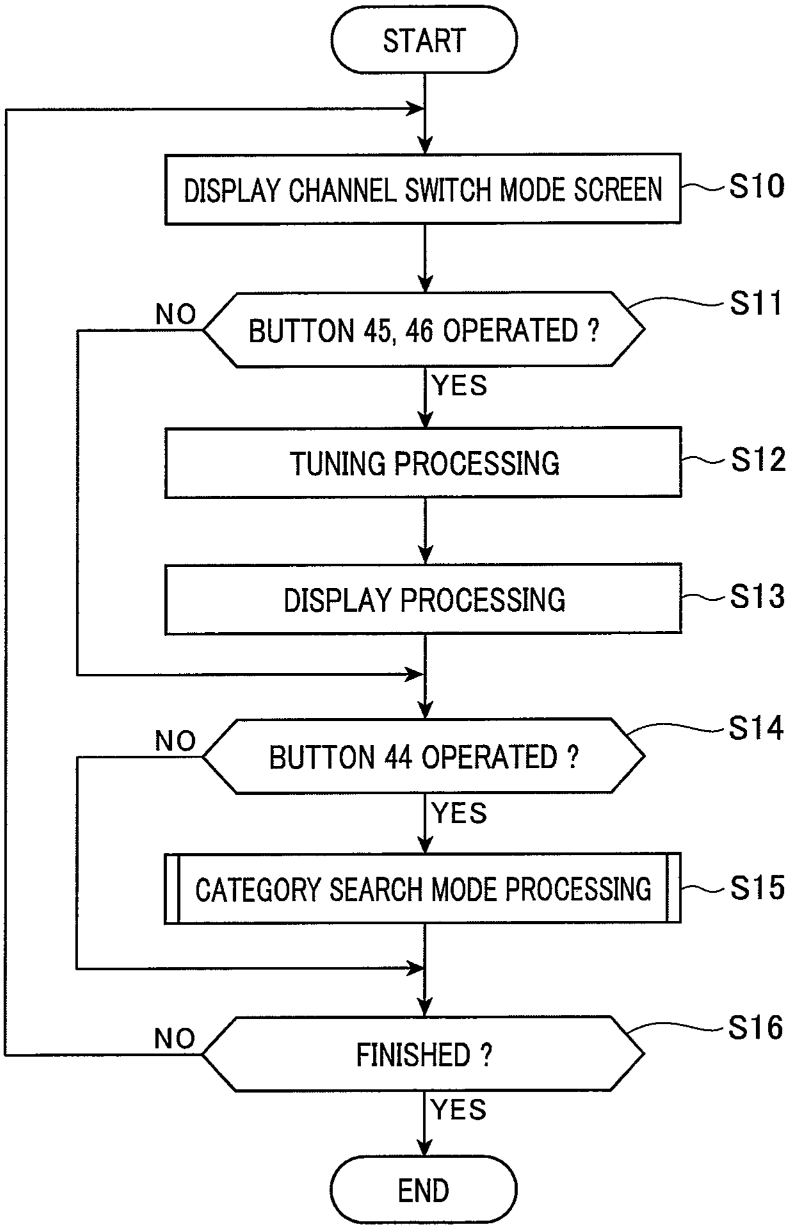
FIG. 3 is a diagram showing an example of processing executed in the embodiment.

Next, the operation of the embodiment will be described. FIG. 3 is a flowchart showing an example of the processing which is executed when the satellite tuner 12 is selected as a reproduction target in the receiving device 10 shown in FIG. 1. The processing when the DVD driving device 14 is selected as a reproduction target is omitted. When the processing of the flowchart of FIG. 3 is started, the following steps are executed. That is, in step S10, the main microcomputer 15 displays the channel switching mode screen shown in FIG. 4 on LCD 17. In the display example of FIG. 4, display areas 41 to 43 and buttons 44 to 46 are displayed on the channel switching mode screen 40. In the display area 41 are displayed a screen mode 41*a*, a reception band 41*b*, a reception channel number 41*c*, a reception channel name 41*d* and a category 41*e*. Here, the screen mode 41*a* indicates the mode of the screen, and any one of "CHAN" representing the channel switching mode and "CAT" representing the category search mode is displayed in the screen mode 41*a*. In this example, "MODE: CHAN" is displayed, and the channel switching mode is indicated. In this example, the reception band 41*b* indicates a band as a reception target, and for example when plural types of broadcast electrical waves (for example, broadcast electrical waves supplied from different broadcast suppliers) can be received, it is indicated which broadcast electrical wave is received. In this example, "BAND: XX1" is displayed and it is indicated that the reception band is "XX1". The reception channel number 41*c* represents the channel number as a reception target. In this example, "CHANNEL: 20" is displayed, and it is indicated that the reception channel number is "20" (information on third line of FIG. 2). The reception channel name 41*d* represents the name of the channel as a reception target. In this example, "NAME: Top 20 Hits" is displayed, and it is indicated that the name of the reception channel is "Top 20 Hits". The category 41*e* represents the primary category of the channel under reception. In this example, "CATEGORY: Hits" is displayed, and it is indicated that the primary category of the reception channel is "Hits".

A music title 42*a* is displayed in the display area 42. The music title 42*a* is the music title of a music under broadcast in a channel which is being currently received. In this example, "SONG: I Got Back In The Saddle" is displayed, and it is indicated that the music title of the music under broadcast is "I Got Back In The Saddle".

An artist name 43*a* is displayed in the display area 43. The artist name 43*a* is the artist name of the music under broadcast in the channel under reception. In this example, "ARTIST: The Szymanowski" is displayed, and the artist name of the music under broadcast is "The Szymanowski".

The button 44 is a software button which is operated when the display mode is switched from the channel switching mode screen to the category search mode. The button 45 is operated when the channel number of the reception channel is reduced (shifted down), and also the button 46 is operated when the channel number of the reception channel is increased (shifted up). More specifically, in the display example of FIG. 3, the channel number is receiving the broadcast of "20", and thus when the button 45 is operated once under this state, the broadcast of the channel number "8" which is smaller than the above channel by one in the table of FIG. 2 is received. Likewise, when the button 46 is operated once under the state of FIG. 4, the broadcast of the channel number "4" is received.

In step S11, the main microcomputer 15 refers to an output from the sub microcomputer 16 to determine whether any one of the buttons 45 and 46 is operated or not. When it is determined that any one of these buttons is operated (step S11: Yes), the processing goes to step S12. In the other cases (step S11: No), the processing goes to step S14. For example, when any one of the buttons 45 and 46 is operated by a user, Yes is determined and thus the processing goes to step S12.

In step S12, the main microcomputer 15 executes tuning processing. More specifically, the main microcomputer 15 specifies which one of the buttons 45 and 46 is operated, and also refers to the table (see FIG. 2) stored in RAM 15*b* to specify the next reception channel corresponding to the operated button. For example, in the example of FIG. 4, the broadcast of the channel number "20" is being received, and thus when the button 45 is operated, the broadcast of the channel number "8" is specified as the next reception channel. When the button 46 is operated, the broadcast of the channel number "41" is specified as the next reception channel. When the next reception channel is specified, the main microcomputer 15 controls the satellite tuner 12 to receive the broadcast of the specified channel. For example, in FIG. 4, when the button 45 is operated, the broadcast of the channel number "8" is received, and when the button 46 is operated, the broadcast of the channel number "41" is received.

In step S13, the main microcomputer 15 obtains information on a channel selected as a reception target in step S12 from the table of RAM 15*b*, and displays the information on LCD 17. For example, when the button 45 is operated, "CHANNEL: 8" is displayed as the reception channel number 41*c*, "NAME: The '80s" is displayed as the reception channel name 41*d*, and "CATEGORY: Decades" which is a primary category is displayed as a category 41*e*. Information corresponding to the music being currently broadcasted is displayed as the music name 42*a* and the artist name 43*a*.

In step S14, it is determined whether the button 44 is operated or not. When the button 44 is determined to be operated (step S14; Yes), the processing goes to step S15. In the other cases (step S14; No), the processing goes to step S16. For example, when the button 44 is operated, the processing goes to step S15.

In step S15, the main microcomputer 15 executes the category search mode processing. The details of this processing will be described later with reference to FIG. 5. In the category search mode processing, the broadcasts containing the specified category as the primary category or the secondary category are successively selected and received.

In step S16, the main microcomputer 15 determines whether the processing is finished or not. When the processing is not finished (step S16; No), the processing returns to step S10 to execute the same processing as the case described above. In the other cases (step S16; Yes), the processing is finished. For example, when the power of the receiving device 10 is turned off, Yes is determined, and the processing is finished.

Figure 5:
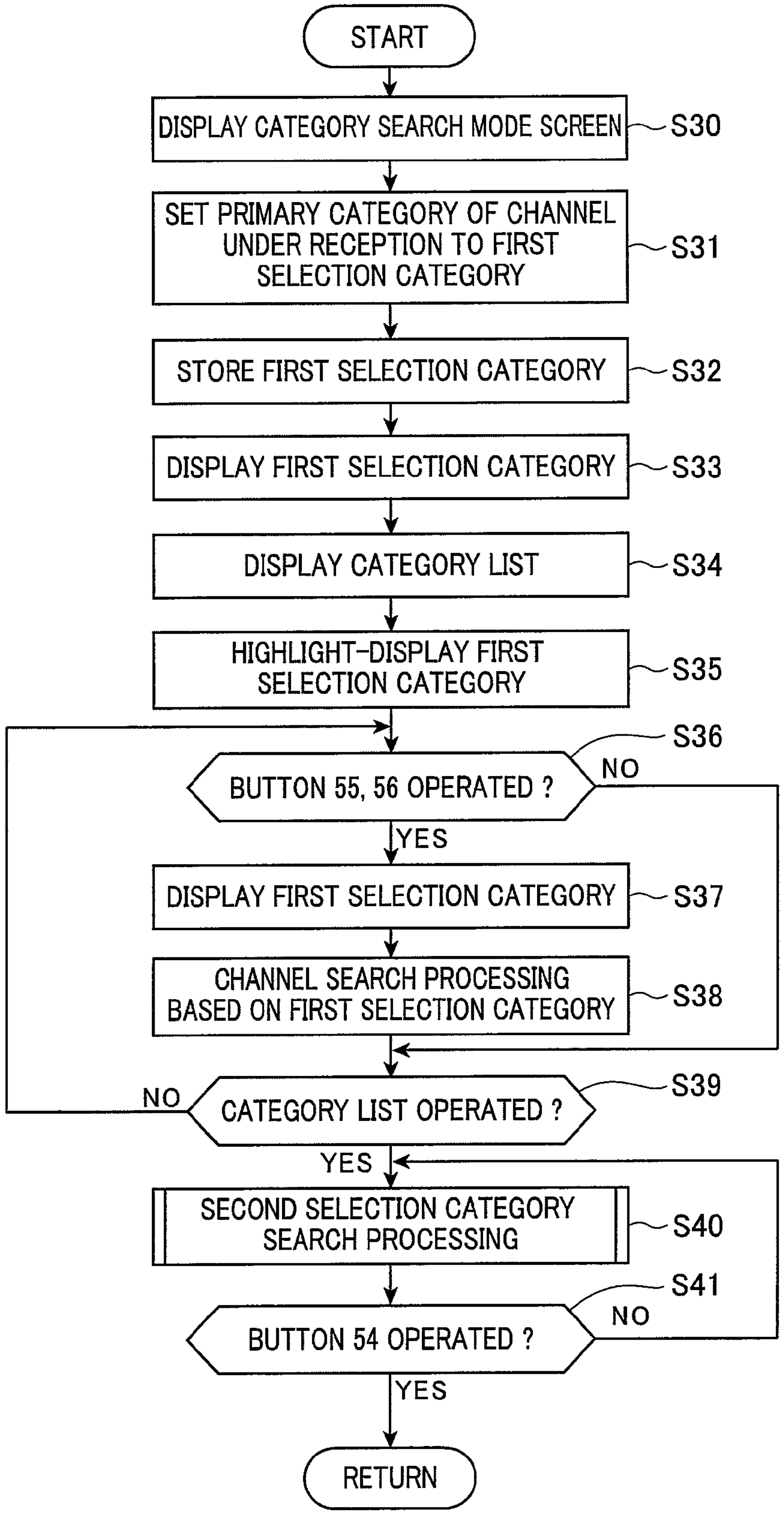
FIG. 5 is a diagram showing the details of the processing of step S15 of FIG. 3.
Figure 6:
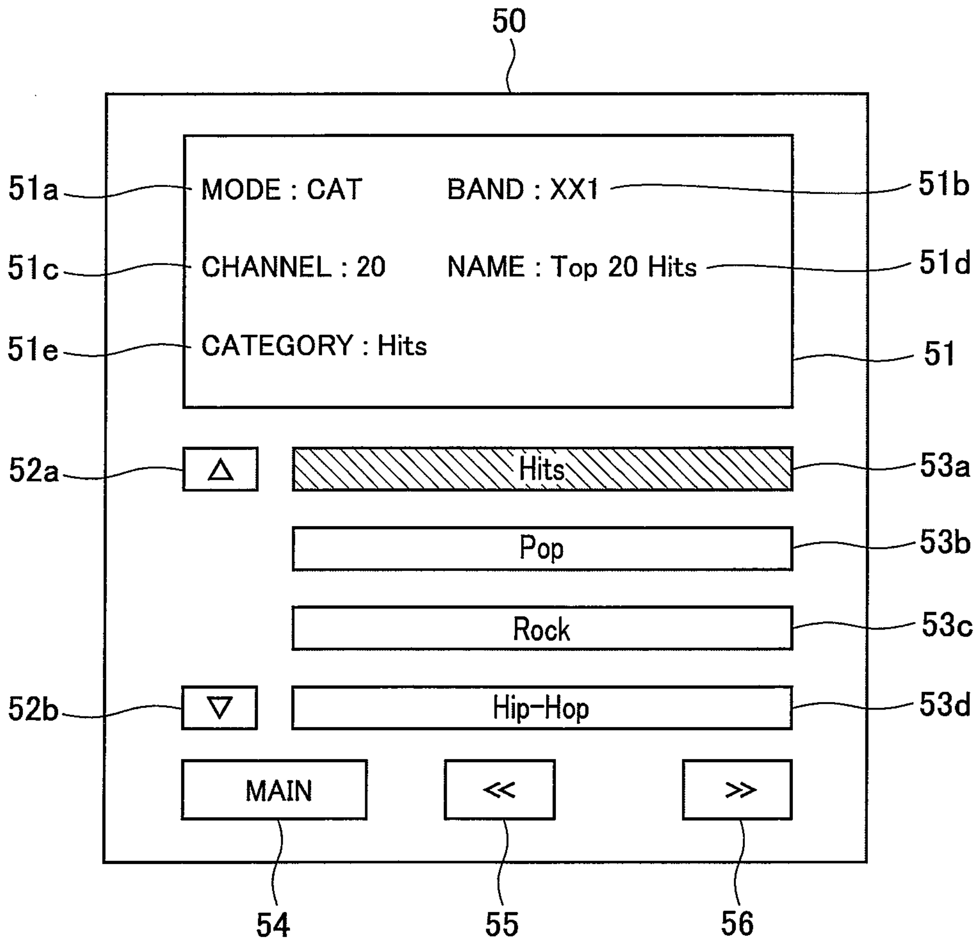
FIG. 6 shows a display example of a category search mode screen.

FIG. 5 shows an example of a flowchart showing the details of "category search mode processing" shown in step S15 of FIG. 3. When the processing of this flowchart is started, the following step is executed. That is, in step S30, the main microcomputer 15 displays the category search mode screen on LCD 17. FIG. 6 is a diagram showing a display example of the category search mode screen. In this display example, a display area 51, buttons 52*a*, 52*b*, buttons 53*a* to 53*d* and buttons 54 to 56 are displayed on the category search mode screen 50.

A screen mode 51*a*, a reception band 51*b*, a reception channel number 51*c*, a reception channel name 51*d* and a category 51*e* are displayed in the display area 51. Here, the screen mode 51*a* represents the mode of the screen, and any one of "CHAN" representing the channel switching mode and "CAT" representing the category search mode is displayed in the screen mode 51*a*. In this example, "MODE: CAT" is displayed, and it indicates the category search mode. The reception band 51*b* represents a band as a reception target as in the case of FIG. 4. In this example, "BAND: XX1" is displayed, and it indicates that the reception band is "XX1". The reception channel number 51*c* represents the channel number as a reception target. In this example, the screen is shifted from the screen of FIG. 4, and thus "CHANNEL: 20" is displayed as in the case of FIG. 4. Therefore, it is indicated that the reception channel number is "20" (information on the third line of FIG. 2). The reception channel name 51*d* represents the name of the channel as a reception target. In this example, "NAME: Top 20 Hits" is displayed, and it is indicated that the name of the reception channel is "Top 20 Hits". The category 51*e* represents the first selection category as described later. In this example, "CATEGORY: Hits" is displayed, and it is indicated that the first selection category is "Hits". The first selection category will be described in the processing of the step S31 and subsequent steps.

The buttons 52*a*, 52*b* are buttons to be operated when the display range of the buttons 53*a* to 53*d* as a category list is changed (scrolled). The buttons 53*a* to 53*d* are buttons to be operated when a category as a search target is selected. More specifically, the items of the categories contained in the primary category and the secondary category of FIG. 2 are displayed as the buttons 53*a* to 53*d*. In this example, the buttons corresponding to "Hits", "Pop", "Rock" and "Hip-Hop" are displayed. When the button 52*a*, 52*b* is operated, the items of the categories other than these categories (for example, buttons corresponding to "Decades", "Dance" and "Jazz" (not shown)) are newly displayed. The buttons 53*a* to 53*d* are displayed on LCD 17 in the processing of step S34 described later.

Figure 4:
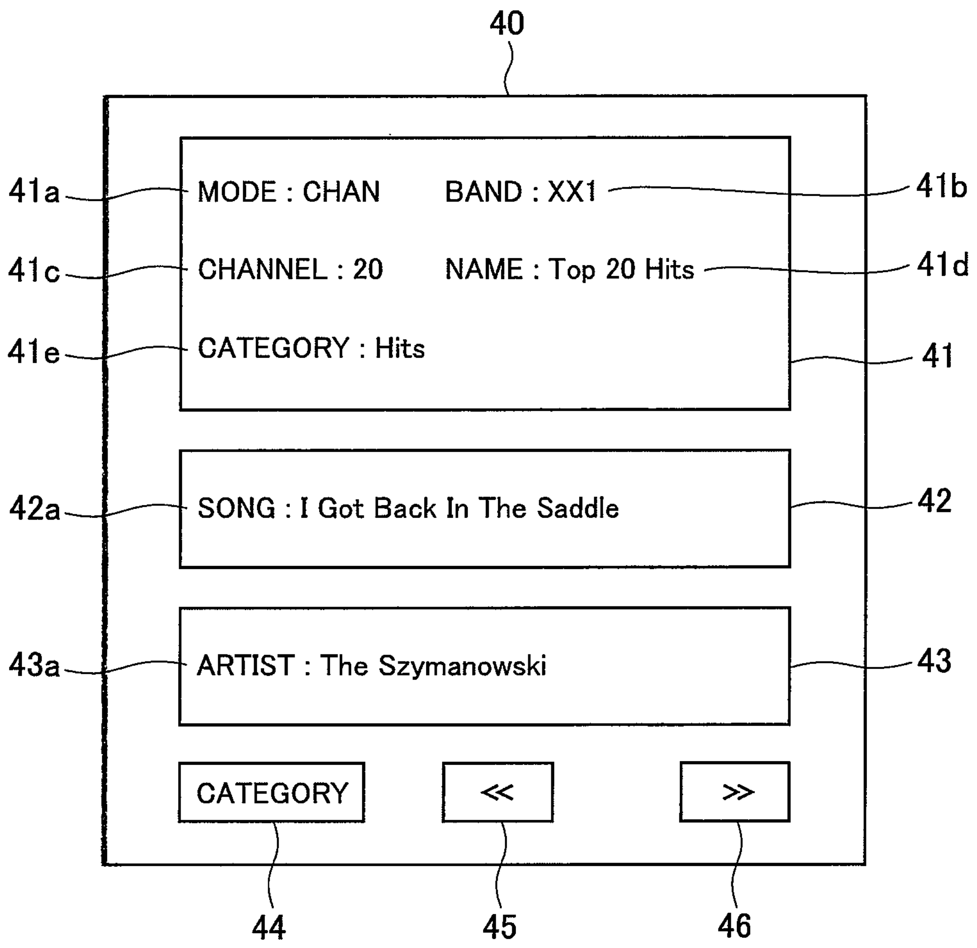
FIG. 4 shows a display example of a channel switching mode screen mode.

The button 54 is operated when the screen is returned to the channel switching mode screen shown in FIG. 4. The buttons 55, 56 are operated when a channel containing a selected category (first selection category or second selection category) in the primary category or the secondary category is searched (searched). That is, the button 55 is operated when a broadcast of a channel which contains a selected category in the primary category or the secondary category and has a channel number smaller than the channel being currently received is received, and the button 56 is operated when a broadcast of a channel which contains a selected category in the primary category or the secondary category and has a channel number larger than the channel being currently received is received. More specifically, in the display example of FIG. 6, "Hits" displayed in the category 51*a* is a selected category, and the broadcast of the channel number "20" is currently being received. Therefore, when the button 55 is operated once under this state, a broadcast which contains "Hits" in the secondary category and has the channel number "8" is searched and received. Likewise, when the button 56 is operated once under this state, a broadcast which contains "Hits" in the secondary category and has the channel number "41" is searched and received.

In step 31, the main microcomputer 15 sets the primary category of the channel under reception to the first selection category. More specifically, for example, when the button 44 is operated on the screen of FIG. 4, the broadcast of the channel number "20" is being received. Therefore, in step S30, "Hits" which is the primary category of the broadcast of the channel number "20" is set to the first selection category.

In step S32, the main microcomputer 15 stores the first selection category into RAM 15*b*. In the example of FIG. 4, "Hits" which is the primary category of the broadcast of the channel number "20" is stored as the first selection category in RAM 15*b*.

In step S33, the main microcomputer 15 displays the first selection category stored in RAM 15*b* as a category 51*e* in LCD 17. In this example, "Hits" is the first selection category, and thus "Hits" is displayed as the category 51*e* in LCD 17 as shown in FIG. 6.

In step S34, the main microcomputer 15 displays the buttons 53*a* to 53*d* as a category list on LCD 17. When the buttons are displayed, they may be sorted so that the button corresponding to the first selection category is located at the uppermost portion. In the example of FIG. 6, the button 53*a* corresponding to "Hits" as the first selection category is displayed at the uppermost portion.

In step S35, the main microcomputer 15 displays the button corresponding to the first selection category in a highlight display style. Specifically, in this example, "Hits" is the first selection category, and thus the button 53*a* corresponding to "Hits" is displayed on LCD 17 in the highlight display style as shown in FIG. 6. A blinking style or other display styles may be adopted in place of the highlight display style.

In step S36, the main microcomputer 15 refers to an output from the sub microcomputer 16 to determine whether the button 55, 56 is operated or not. When it is determined that any one of the buttons 55 and 56 is operated (step S36: Yes), the processing goes to step S37, and in the other cases (step S36: No), the processing goes to step S39.

In step S37, the main computer 15 displays the first selection category stored in RAM 15*b* as a category 51*e* on LCD 17 as in the case of the step S33. In this example, "Hits" which is the primary category of the broadcast of the channel number "20" is stored as the first selection category in RAM 15*b*, and thus "Hits" is displayed as the category 51*e* on LCD 17 as shown in FIG. 6. The processing of the step S37 is repeatedly executed while the processing of the steps S36 to S39 is repeated. Therefore, even when the button 55, 56 is operated and the category search is executed, the same first selection category is continually displayed as the category 51*e* on LCD 17 unless the buttons 53*a* to 53*d* are operated as the category list. Accordingly, even when the channel containing the category of the search condition as the secondary category is searched (displayed), the primary category of the channel concerned is displayed as in the case of the prior art, and thus it can be prevented from being set as the search condition in the next category search operation.

Figure 7:
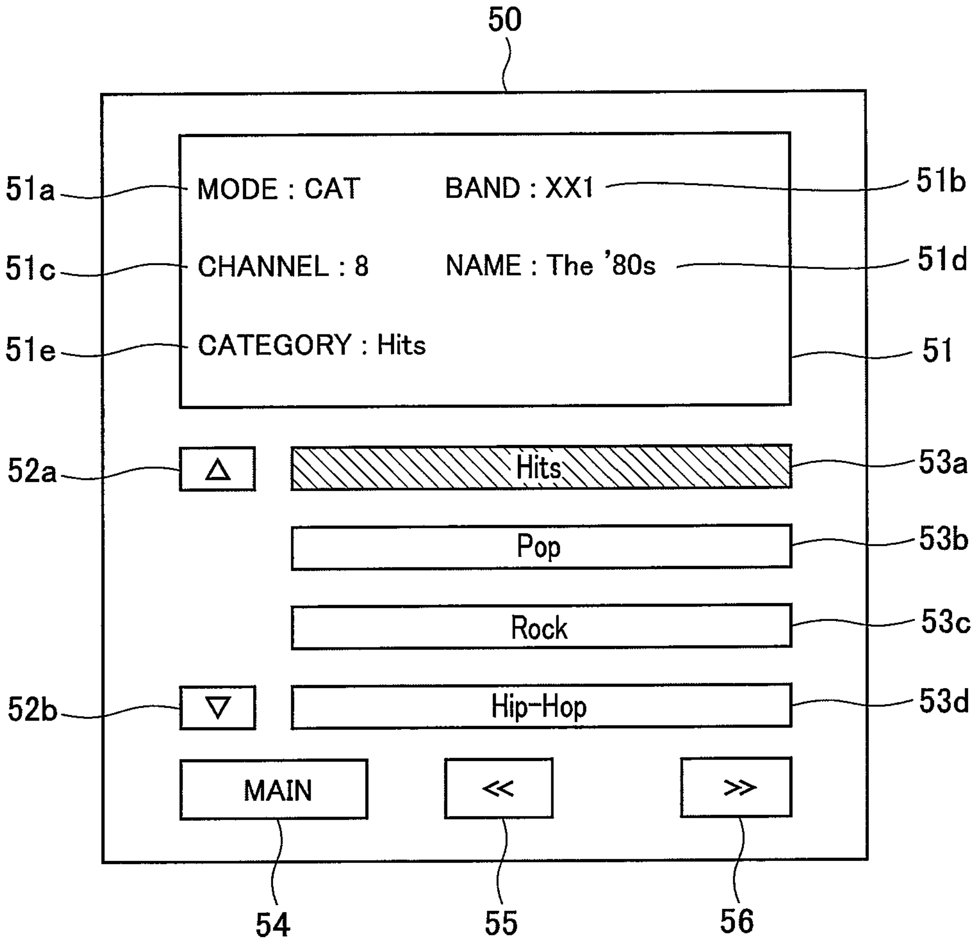
FIG. 7 shows a display example of a screen displayed when a button 55 is operated in FIG. 6.

In step S38, the main microcomputer 15 executes the channel search processing on the basis of the first selection category. That is, when the button 55 is operated, the main microcomputer 15 searches from the table of RAM 15*b* a channel which contains the first selection category in the primary category or the secondary category and has a channel number smaller than the channel being currently received, and supplies the channel number of the thus-searched channel to the satellite tuner 12 so that the satellite tuner 12 receives the channel number and displays the information concerning the channel concerned on LCD 17. In this example, "Hits" is the first selection category, and thus when the button 545 is operated, the broadcast which has "Hits" in the secondary category and has the channel number "8" is selected and received. FIG. 7 is a diagram showing an example of the screen displayed at this time. In this example, the reception channel number 51*c* is changed to "8" as compared with the case of FIG. 6. Furthermore, the reception channel name 51*d* is changed to "The '80s". "Hits" as the first selection category is continually displayed at the category 51*e*. When the button 55 is operated again on the display screen shown in FIG. 7, the broadcast which has "Hits" in the secondary category and has the channel number 4" is selected and received.

Figure 8:
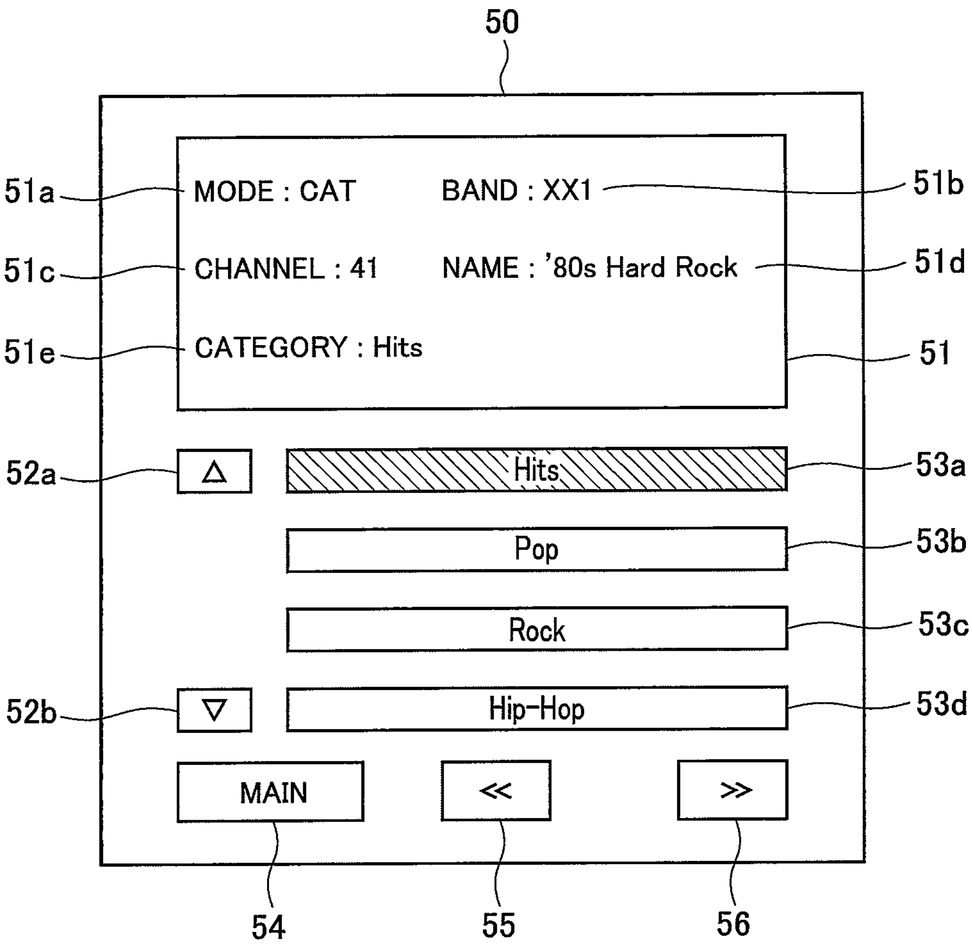
FIG. 8 shows a display example of a screen displayed when a button 56 is operated in FIG. 6.

On the other hand, in FIG. 6, when the button 56 is operated, the broadcast which has "Hits" in the secondary category and has the channel number "41" is selected and received. FIG. 8 is a diagram showing an example of the screen displayed at this time. In this example, as compared with the case of FIG. 6, the reception channel number 51*c* is changed to "41". Furthermore, the reception channel name 51*d* is changed to "'80s Hard Rock". "Hits" as the first selection category is continually displayed at the category 51*e*. When the button 56 is operated again on the display screen shown in FIG. 8, the broadcast which has "Hits" in the secondary category and has the channel number "60" is selected and received. When the processing reaches the head or end of the channels, the processing is circulated to the end or head to repeat the same processing.

In step S39, the main microcomputer 15 determines whether any one of the buttons 53*a* to 53*d* as the category list is operated or not. when operated (step S39: Yes), the processing goes to step S40. In the other cases (step S39: No), the processing returns to step S36 to repeat the same processing as described above. When the button 52*a*, 52*b* is operated and a button for a new range (not shown) is displayed, the processing goes to step S40 by operating any button of the new range.

In step S40, the main microcomputer 15 sets the category corresponding to the button operated in step S39 to the second selection category, and executes second selection category search processing for searching a channel. The details of this processing will be described later with reference to FIG. 9.

In step S41, the main microcomputer 15 determines whether the button 54 is operated or not. When the button 54 is operated (step S41: Yes), the processing returns to the processing of FIG. 3, and in the other cases (step S41: No), the processing returns to step S40 to repeat the same processing as described above. The processing may be returned to the processing of FIG. 3 not when the button 54 is operated, but when the operation is not executed for a predetermined time (for example, 15 seconds) or more. When Yes is determined in step S41 and the processing is returned to the processing of FIG. 3, the same channel switching mode screen as shown in FIG. 4 is displayed on LCD 17, and also the broadcast of a channel selected through channel search is received and reproduced. Furthermore, information concerning the selected channel is displayed on LCD 17.

According to the above processing, the screen is shifted to the category search mode screen by operating the button 44 on the channel switching mode screen, and the channel having the category corresponding to the primary category of the broadcast under reception in the primary category or the secondary category can be searched on the channel switching mode screen. Therefore, other broadcasts of the same category as the broadcast being currently received can be rapidly searched.

Figure 9:
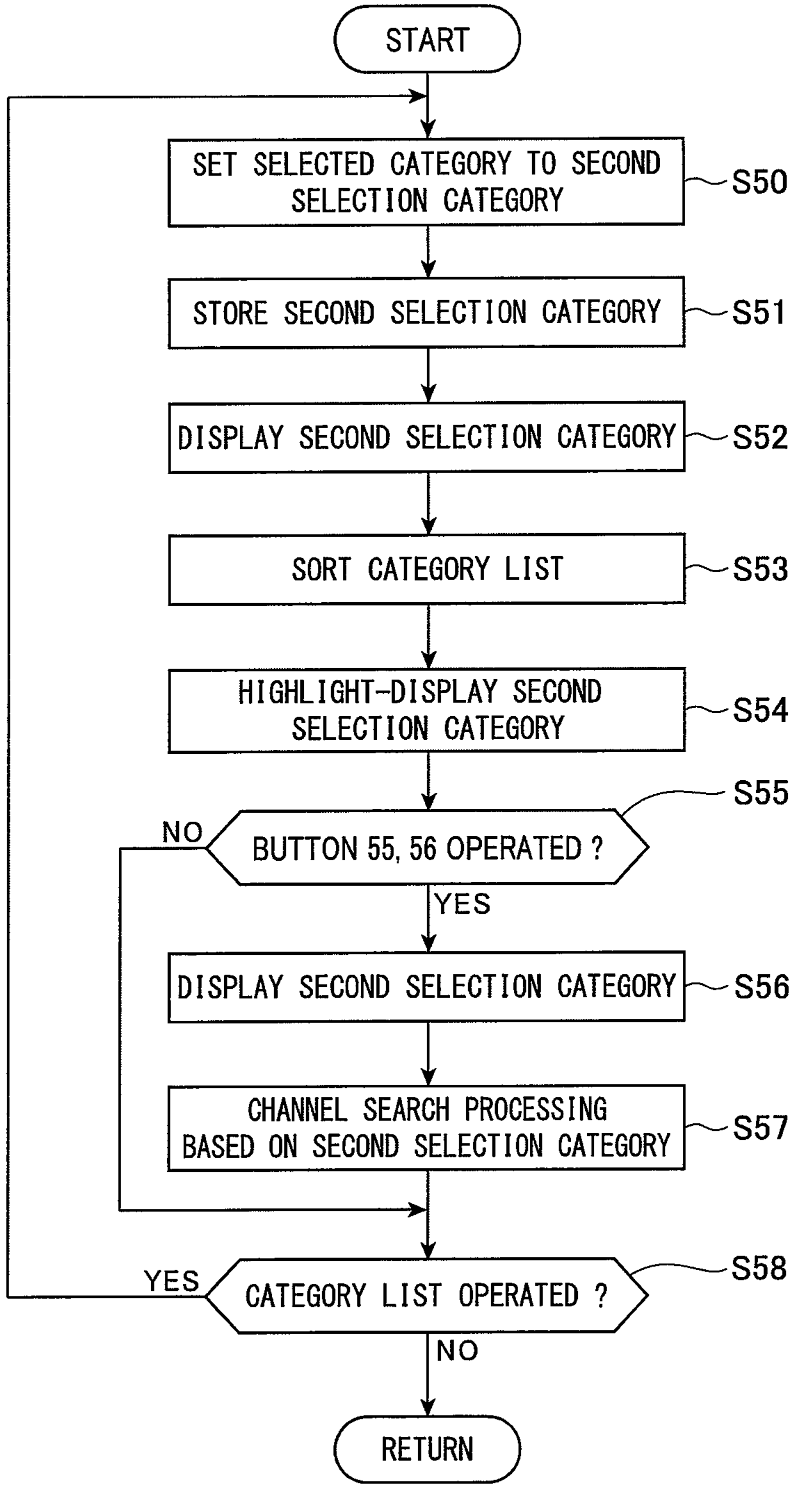
FIG. 9 is a diagram showing the details of the processing of step S40 of FIG. 5.

Next, the details of the processing of the step S40 shown in FIG. 5 will be described with reference to the flowchart of FIG. 9. When the processing of the flowchart of FIG. 9 is started, the next step is executed. That is, in step S50, the main microcomputer 15 sets the category selected in the category list to the second selection category. More specifically, for example when the button 53*b* is operated on the screen of FIG. 6, "Pop" which is the category corresponding to the button 53*b* is set in the second selection category in step S50.

In step S51, the main microcomputer 15 stores the second selection category into RAM 15*b*. In this example, "Pop" which is the category corresponding to the button 53*b* is stored as the second selection category in RAM 15*b*.

Figure 10:
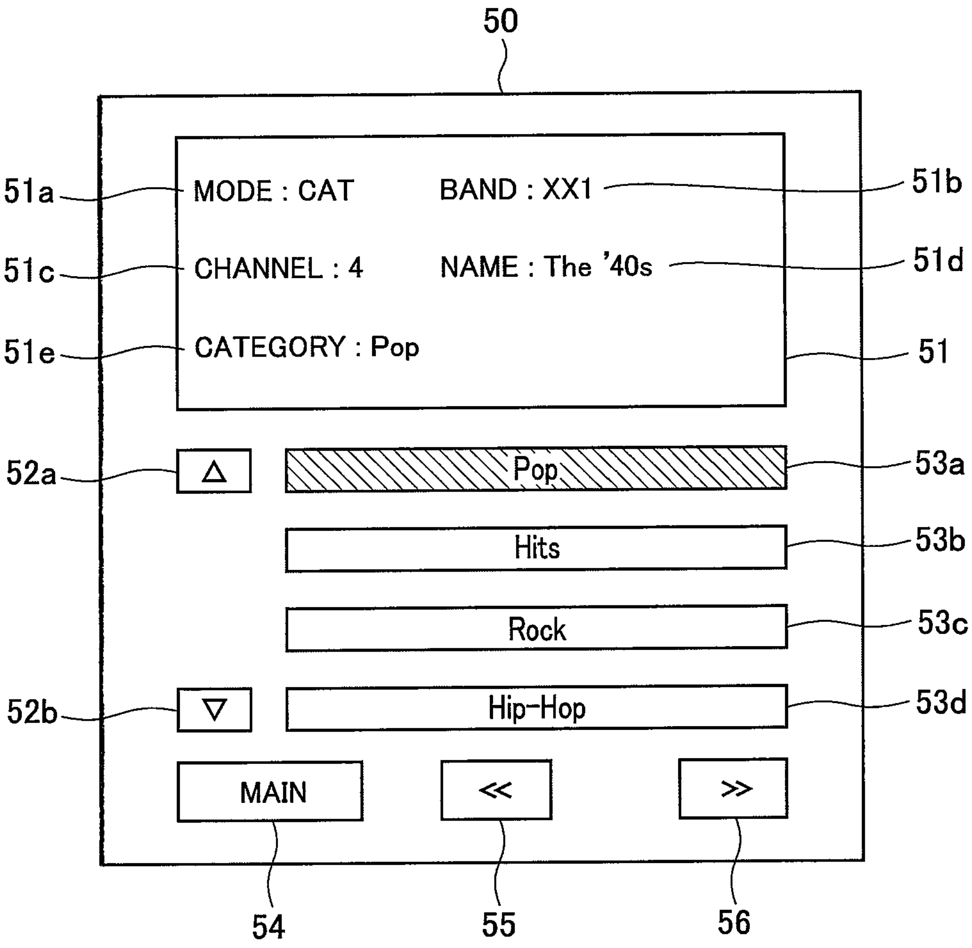
FIG. 10 shows a display example of a screen displayed when a button 53*b* is operated in FIG. 8.

In step S52, the main microcomputer 15 displays the second selection category as the category 51*e* on LCD 17. In this example, "Pop" is the second selection category, and thus "Pop" is displayed as the category 51*e* on LCD 17 as shown in FIG. 10. Furthermore, a broadcast in which the primary category or the secondary category contains "Pop" as the second selection category in the table shown in FIG. 2 and the channel number on the first line having the smallest channel number value is "4" is received by the satellite tuner 12, and the information concerning the broadcast of the channel number "4" is displayed on LCD 17 as shown in FIG. 10. That is, in the display example of FIG. 10, "CHANNEL: 4" as the reception channel number 51*c* is displayed, "NAME: The '40s" is displayed as the reception channel name 51*d*, and "CATEGORY: Pop" as the second selection category is displayed as the category 51*e*.

In step S53, the main microcomputer 15 sorts (rearranges) the buttons 53*a* to 53*d* as the category list. In the example of FIG. 10, the display content is sorted so that the second selection category is located at the uppermost portion. That is, in the example of FIG. 10, as compared with the case of FIG. 6, the display of the button 53*a* is set to "Pop" as the second category, and the display of the button 53*b* is set to "Hits".

In step S54, the main microcomputer 15 displays the button corresponding to the second selection category in a highlight display style. Specifically, in this example, "Pop" is the second selection category, and thus the button 53*a* corresponding to "Pop" is displayed on LCD 17 in the highlight display style as shown in FIG. 10. It may be displayed in a blinking display style or other display styles in place of the highlight display style.

In step S55, the main microcomputer 15 determines whether the button 55, 56 is operated or not. When it is operated (step S55; Yes), the processing goes to step S56. In the other cases (step S56; No), the processing goes to step S58. For example, when the button 56 is operated, the processing goes to step S56.

In step S56, the main microcomputer 15 displays the second selection category stored in RAM 15*b* as the category 51*e* on LCD 17. As a result, the second selection category is displayed as the category 51*e* while the button 55, 56 is operated and the category search is executed. Therefore, even when the button 55, 56 is operated and the category search is executed, the same second selection category is continually displayed as the category 51*e* on LCD 17 unless the buttons 53*a* to 53*d* as the category list are operated. Accordingly, even when the channel containing the category of the search condition as the secondary category is searched (displayed), it can be prevented that the primary category of the channel concerned is displayed and becomes the search condition in the next category search operation as in the case of the prior art.

Figure 11:
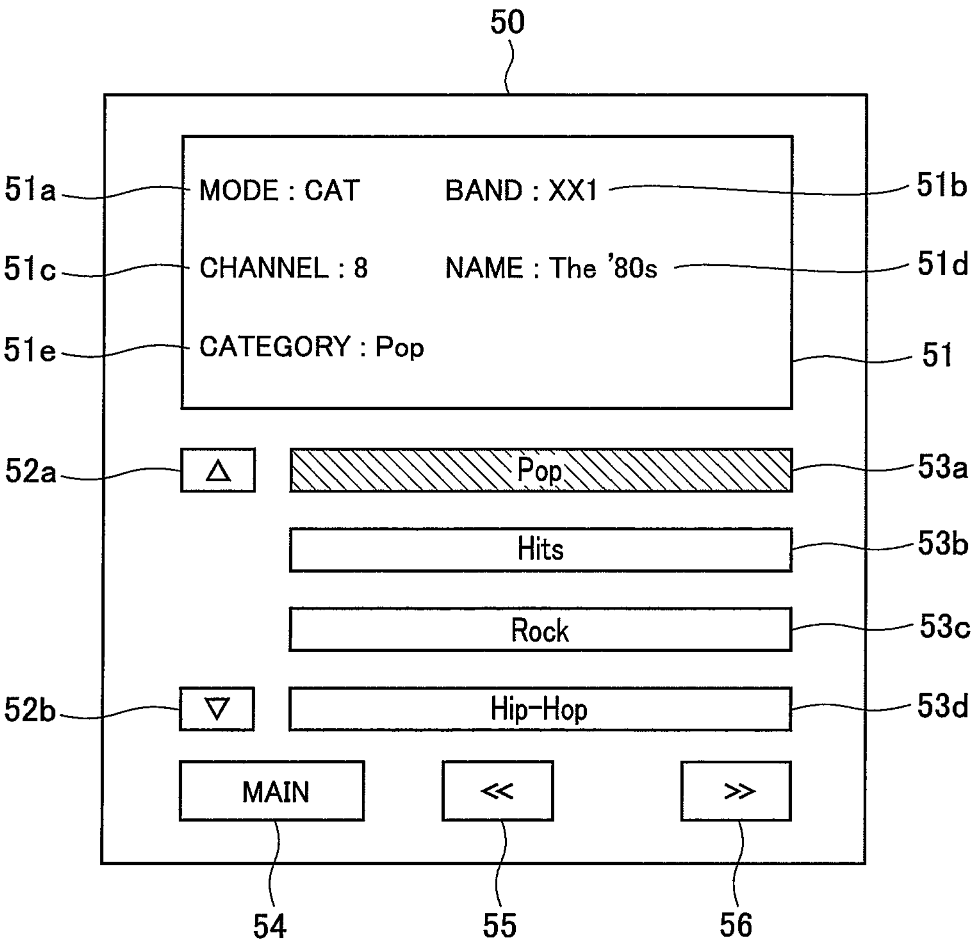
FIG. 11 shows a display example of a screen displayed when a button 56 is operated in FIG. 10.

In step S57, the main microcomputer 15 executes the channel search processing on the basis of the second selection category. In this example, "Pop" is selected as the second selection category, and thus channels having "Pop" in the primary category or the secondary category are successively searched and reproduced in accordance with the operation of the button 55, 56. More specifically, when the button 56 is operated on the screen shown in FIG. 10, the broadcast which has "Pop" in the secondary category and whose channel number is equal to "8" is searched, and received. In addition, information concerning the broadcast whose channel number is "8" is displayed on LCD 17 as shown in FIG. 11. In the example of FIG. 11, "CHANNEL: 8" is displayed as the reception channel number 51*c*, "NAME: The '80s" is displayed as the reception channel name 51*d*, and "CATEGORY: Pop" which is the second selection category is displayed as the category 51*e*.

In step S58, the main microcomputer 15 determines whether any one of the buttons 53*a* to 53*d* as the category list is operated or not. When it is operated (step S58: Yes), the processing returns to step S50 to repeat the same processing as described above, and in the other cases (step S58: No), the processing returns to the original processing (the processing of FIG. 5). When the button 52*a*, 52*b* is operated and a button in a new range (not shown) is displayed, the processing returns to the step S50 in accordance with the operation of the button of the new range. As a result, for example, when the button 53*c* corresponding to the category "Rock" is operated, the processing returns to step S50, "Rock" is set to the second selection category, and the channel search processing is executed.

According to the above processing, the broadcast in which the primary category of the broadcast under reception is set as the first selection category and the same category as the first selection category is contained in the primary category or the secondary category is searched on the channel switching mode screen. When any one of the buttons 53*a* to 53*d* as the category list is operated, the broadcast which has the category corresponding to the operated button in the primary category or the secondary category can be searched. Therefore, for example, a broadcast having the same category as the primary category of the broadcast under reception as the primary category or the secondary category is searched on the channel switching mode screen, and also when a desired broadcast does not exist through the search concerned, a different category can be selected by the buttons 53*a* to 53*d*, and the channel search can be performed on the basis of the selected category.

As described above, according to the embodiment of this invention, the primary category of the channel under reception is displayed as the category 41*e* on the channel switching mode screen, and the first selection category or the second selection category is displayed as the category 51*e* on the category search mode screen. Therefore, the category with which the search is being currently executed can be clearly known. Furthermore, the indicated category is stored as the first selection category or the second selection category, and the channel search is executed on the basis of these stored categories. Therefore, the category as the search target is not varied, and thus the search can be rapidly performed.

The primary category of the channel under reception is set as the first selection category on the channel switching mode screen, and the channel search is executed on the basis of the first selection category until any one of the buttons 53*a* to 53*d* as the category list is operated. Therefore, the broadcast having the same category as the channel under reception can be searched on the channel switching mode screen. Furthermore, when any one of the buttons 53*a* to 53*b* is operated on the category search mode screen, the category corresponding to the operated button is set as the second selection category, and the channel search is executed on the basis of the second selection category. Therefore, the channel search based on any category can be performed.

Furthermore, when the channel search based on the category information is repeatedly executed, the search can be performed at a small number of operation times, and also a search condition desired by a user can be maintained although this embodiment is adaptable to a channel having only one category information. Therefore, the category search can be easily performed at a small number of operation times even when a vehicle is being driven.

(C) Modifications

Each of the above embodiment is merely an embodiment of the present invention, and it is needless to say that any modification and application may be performed within the scope of the present invention.

For example, each of the above embodiments is configured so that audio information is received and reproduced. However, information other than audio, for example, video information, text information or other information may be received.

Furthermore, in the above embodiments, the primary category is set to one type, and the secondary category is set to three types. However, the number of types may be set to any number other than the above numbers. For example, the primary category may be set to two or more types, and the secondary category may be set to two or less types or four or more types. Furthermore, in the channel search, the search may be performed not by referring to all the types, but by referring to only some types. For example, the search is not executed by referring to all the three types of secondary categories, but executed by referring to only the highest secondary category or higher two secondary categories.

DESCRIPTION OF REFERENCE NUMERALS

10 receiving device
11 antenna
12 satellite tuner
13 DSP
14 DVD driving device
15 main microcomputer
15*a* ROM
15*b* RAM
16 sub microcomputer
17 LCD
18 touch panel
19 amplifying circuit
20 speaker

The invention claimed is:

1. A receiving device for receiving any channel from plural channels through which broadcast is performed characterized by comprising:

storing means for storing a category contained upper category information of a channel under reception when each channel is associated with one or plural category information pieces representing a category of the channel concerned, one category information piece is set as upper category information and the other category information pieces are set as lower category information;

display means for displaying a category stored in the storing means;

instructing means for accepting an instruction of search execution during reception of the channel;

search means for searching the channel containing the category stored in the storing means as the upper category information or the lower category information when the search execution is instructed by the instructing means;

tuning means for tuning and receiving the channel searched by the searching means; and control means for shifting to a state that a category as a search condition can be input when the search execution is instructed by the instructing means, storing an input category as a new search condition into the storing means when the category is input under the state, making the searching means perform a search, and making the display means display the stored category wherein the control means displays a list of categories which can be selectively input as a search condition when the search execution is instructed by the instructing means, displays categories stored in the storing means out of the categories displayed in the list so that the categories can be selected, and stores as selected category as a new search condition into the storing means when another category out of the categories of the list is selected.

2. The receiving device according to claim 1, wherein after the category selected from the displayed list of the categories is stored in the storing means, the control means stores the category stored in the storing means without changing the category until another category is selected from the displayed list of the categories or an operation of instructing to finish the search is executed after the category.

3. The receiving device according to any one of claims 1 or 2, wherein the receiving device is an in-vehicle mount type receiving device that is mounted in a vehicle and receives the broadcast under running of the vehicle.

4. A control method for a receiving device for receiving any channel from a plurality channels to be broadcasted, characterized by comprising:

a storing step for storing a category contained upper category information of a channel under reception when each channel is associated with one or plural category information pieces representing a category of the channel concerned, one category information piece is set as upper category information and the other category information pieces are set as lower category information; a display step for displaying a category stored in the storing means;

an instructing step for accepting an instruction of search execution during reception of the channel;

a control step for shifting to a state that a category as a search condition can be input when the search execution is instructed in the instructing step, storing an input category as a new search condition when the category is input under the state concerned, and displaying the stored category in place of the category displayed in the display step;

a search step for searching the channel containing the category stored in the storing step as the upper category information or the lower category information; and a tuning step for tuning and receiving the channel searched in the searching step wherein the control step comprises: displaying a list of categories which can be selectively input as a search condition when the search execution is instructed in the instructing step, displaying categories stored in the storing step out of the categories displayed in the list so that the categories can be selected, and storing a selected category as a new search condition when another category out of the categories of the list is selected.

* * * * *